United States Patent
Kim et al.

(10) Patent No.: US 9,979,512 B2
(45) Date of Patent: May 22, 2018

(54) METHODS AND APPARATUSES FOR TRANSMITTING AND RECEIVING DATA AND RECORDING MEDIUM FOR EXECUTING THE METHODS

(71) Applicant: SAMSUNG ELECTRONICS CO., LTD., Suwon-si (KR)

(72) Inventors: Sung-kee Kim, Hwaseong-si (KR); Ga-hyun Ryu, Suwon-si (KR); Duk-gu Sung, Seoul (KR); Chun-bae Park, Suwon-si (KR); Do-young Joung, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 211 days.

(21) Appl. No.: 14/327,953

(22) Filed: Jul. 10, 2014

(65) Prior Publication Data

US 2015/0019716 A1 Jan. 15, 2015

(30) Foreign Application Priority Data

Jul. 10, 2013 (KR) .................. 10-2013-0081200

(51) Int. Cl.
*H04L 12/825* (2013.01)
*H04L 1/18* (2006.01)
(Continued)

(52) U.S. Cl.
CPC .......... *H04L 1/1809* (2013.01); *H04L 1/1825* (2013.01); *H04L 47/25* (2013.01);
(Continued)

(58) Field of Classification Search
CPC ....... H04L 1/18; H04L 1/1825; H04L 1/1822; H04L 1/1896; H04L 1/1864; H04L 1/1858
See application file for complete search history.

(56) References Cited

U.S. PATENT DOCUMENTS

| 2003/0039218 A1 | 2/2003 | Kwak |
| 2003/0120802 A1* | 6/2003 | Kohno ................... H04L 29/06 709/237 |

(Continued)

FOREIGN PATENT DOCUMENTS

| CN | 1545656 A | 11/2004 |
| EP | 1 667 395 A1 | 6/2006 |

(Continued)

OTHER PUBLICATIONS

Written Opinion dated Oct. 16, 2014 issued by International Searching Authority in counterpart International Patent Application No. PCT/KR2014/006187.

(Continued)

*Primary Examiner* — Tom Y Chang
(74) *Attorney, Agent, or Firm* — Sughrue Mion, PLLC

(57) ABSTRACT

A method of transmitting data, the method includes transmitting a frame containing at least one data packet; generating at least one detection packet for detecting a loss of a last data packet among the at least one data packet; and in response to the last data packet of the frame being transmitted, transmitting the at least one detection packet so that the detection packet is transmitted subsequent to the data packet. Whether or not the last data packet is lost is determined by using the detection packet.

13 Claims, 8 Drawing Sheets

(51) Int. Cl.
    *G06F 11/08* (2006.01)
    *H04L 12/801* (2013.01)
    *G06F 11/14* (2006.01)
    *H04L 12/26* (2006.01)

(52) U.S. Cl.
    CPC .............. *G06F 11/08* (2013.01); *G06F 11/14* (2013.01); *H04L 43/0835* (2013.01); *H04L 43/10* (2013.01); *H04L 47/12* (2013.01)

(56) References Cited

U.S. PATENT DOCUMENTS

| | | |
|---|---|---|
| 2005/0185604 A1 | 8/2005 | Agarwal |
| 2007/0008884 A1 | 1/2007 | Tang |
| 2008/0049747 A1* | 2/2008 | McNaughton ...... H04L 12/6418 370/389 |
| 2008/0172708 A1* | 7/2008 | Perry ................. H04W 72/005 725/110 |
| 2009/0046662 A1* | 2/2009 | Casati .................. H04W 36/02 370/331 |
| 2009/0059811 A1* | 3/2009 | Wisely ................... H04L 45/00 370/252 |
| 2009/0245103 A1 | 10/2009 | Miyazaki |
| 2011/0038369 A1 | 2/2011 | Lee et al. |
| 2011/0314351 A1 | 12/2011 | Tada et al. |
| 2012/0269086 A1 | 10/2012 | Yue et al. |
| 2014/0056234 A1* | 2/2014 | Hedlund ............... H04W 24/02 370/329 |

FOREIGN PATENT DOCUMENTS

| | | |
|---|---|---|
| KR | 10-2011-0017518 A | 2/2011 |
| WO | 2010108958 A1 | 9/2010 |

OTHER PUBLICATIONS

International Search Report dated Oct. 16, 2014 issued by International Searching Authority in counterpart International Patent Application No. PCT/KR2014/006187.

Communication dated Jan. 12, 2017 issued by the European Patent Office in counterpart European Patent Application No. 14823372.9.

Communication issued by the State Intellectual Property Office of P.R. China dated Feb. 11, 2018 in counterpart Chinese Patent Application No. 201480039602.6.

* cited by examiner

METHODS AND APPARATUSES FOR TRANSMITTING AND RECEIVING DATA AND RECORDING MEDIUM FOR EXECUTING THE METHODS

RELATED APPLICATIONS

This application claims the benefit of Korean Patent Application No. 10-2013-0081200, filed on Jul. 10, 2013, in the Korean Intellectual Property Office, the disclosure of which is incorporated herein in its entirety by reference.

BACKGROUND

1. Field

One or more exemplary embodiments relate to methods and apparatuses for transmitting and receiving data, and a recording medium for executing the methods.

2. Description of the Related Art

When transmitting data over a network, data may be lost depending on a network status. Specifically, in real time streaming transmission, data loss may be a direct cause of image quality reduction. In order to prevent the image quality reduction due to data loss, a packet retransmission method, which retransmits lost packets, is used.

In the related art, when a packet is retransmitted, a time delay occurs due to time elapsed during requesting and retransmitting a lost packet. Therefore, conventional packet transmission methods may not be effective for improving image quality in real time streaming transmission.

SUMMARY

One or more exemplary embodiments include methods and apparatuses for transmitting and receiving data, which reduce a time delay due to packet retransmission performed when a packet retransmission method is used to recover lost data during real time data transmission.

Additional aspects will be set forth in part in the description which follows and, in part, will be apparent from the description, or may be learned by practice of one or more exemplary embodiments.

According to one or more exemplary embodiments, a method of transmitting data, the method includes transmitting a frame containing at least one data packet; generating at least one detection packet for detecting a loss of a last data packet among the at least one data packet; and in response to the last data packet of the frame being transmitted, transmitting the at least one detection packet so that the detection packet is transmitted subsequent to the last data packet. Whether or not the last data packet is lost is determined by using the at least one detection packet.

In response to a serial number of the at least one detection packet not being subsequent to a serial number of a data packet most recently received among the at least one data packet, it may be determined that the last data packet is lost. The transmission method may further include transmitting the last data packet to a client, according to a packet retransmission request that is received after the detection packet is transmitted.

In response to a retransmission requested packet not being the at least one detection packet, transmitting the requested packet may be further included in the method.

Analyzing a packet loss rate of a network; and determining a number of the at least one detection packet to be generated according to a result of the analyzing may be further included in the method.

The number of the at least one detection packet may increase as the packet loss rate of the network increases.

According to one or more exemplary embodiments, a method of receiving data, the method includes receiving a frame containing at least one data packet and at least one detection packet for detecting a loss of a last data packet among the at least one data packet; determining whether or not the last data packet is lost by using the at least one detection packet; and requesting retransmission of the last data packet based on a result of the determining.

The determining may further include, in response to a serial number of the at least one detection packet is not subsequent to a serial number of a data packet most recently received among the at least one data packet, requesting retransmission of the last data packet.

The determining may further include determining whether or not a lost packet is a detection packet; and in response to the lost packet not being a detection packet, requesting retransmission of the lost packet.

A number of the at least one detection packet may be determined according to a packet loss rate of a network.

The number of the at least one detection packets may increase as the packet loss rate increases.

According to one or more exemplary embodiments, an apparatus for transmitting a frame of data containing at least one data packet, the apparatus includes a packet generator configured to generate a detection packet for detecting a loss of a last data packet among the at least one data packet; and a transmitter configured to transmit the at least one data packet and the at least one detection packet. The transmitter is further configured to, in response to the last data packet of the frame being transmitted, transmit the at least one detection packet subsequent to the last data packet, and whether or not the last data packet is lost is determined by using the at least one detection packet.

The apparatus may further include a determiner configured to, in response to a serial number of the at least one detection packet not being subsequent to a serial number of a data packet most recently received among the at least one data packet, determine that the last data packet is lost. The transmitter may be further configured to transmit the last data packet to a client, according to a packet retransmission request that is received after the detection packet is transmitted.

In response to a retransmission requested packet not being a detection packet, the transmitter may be further configured to transmit the requested packet.

The apparatus may further include an analyzer configured to analyze a packet loss rate of a network; and the determiner may be further configured to determine a number of the at least one detection packets to be generated, according to a result of the analyzing may be further included in the method.

The number of the at least one detection packet may increase as the packet loss rate of the network increases.

According to one or more exemplary embodiments, there is provided an apparatus for receiving data, the apparatus includes a receiver configured to receive a frame containing at least one data packet and at least one detection packet for detecting a loss of a last data packet among the at least one data packet of the frame; a determiner configured to determine whether or not a last data packet among the at least one data packet of the frame is lost by using the at least one detection packet; and a requester configured to request retransmission of the last data packet based on a result of the determining.

In response to a serial number of the at least one detection packet not being subsequent to a serial number of a data packet most recently received among the at least one data packet, the requester may be further configured to request retransmission of the last data packet among the at least one data packet.

The determiner may be further configured to determine whether or not a lost packet is a detection packet. In response to the lost packet not being a detection packet, the requester may be further configured to request retransmission of the lost packet.

A number of the at least one detection packets may be determined according to a packet loss rate of a network.

The number of the at least one detection packets may increase as the packet loss rate increases.

According to one or more exemplary embodiments, a method of transmitting data is provided, the method includes transmitting the at least one data packet of the frame; and in response to transmitting a last data packet among the at least one data packet of the frame, transmitting at least one detection packet configured to be used to detect a loss of the last data packet. Whether or not the last data packet is lost is determined by using the at least one detection packet.

The at least one data packet and the at least detection packet may comprise respective serial numbers, and in response to the serial number of the at least one detection packet not being sequential to the serial number of a most recently received data packet among the at least one data packet, it may be determined that the last data packet is lost.

According to one or more exemplary embodiments, a method of receiving data is provided, the method includes receiving at least one data packet of a frame and at least one detection packet configured to be used to detect a loss of a last data packet among the at least one data packet of the frame; determining whether or not the last data packet among the at least one data packet of the frame is lost by using the at least one detection packet; and in response to determining that the last data packet is lost, requesting retransmission of the last data packet.

The at least one data packet and the at least detection packet may comprise respective serial numbers, and the determining may comprise determining, in response to the serial number of the at least one detection packet not being sequential to the serial number of a most recently received data packet among the at least one data packet, that the last data packet is lost.

According to one or more exemplary embodiments, an apparatus configured to transmit at least one data packet of a frame is provided, the apparatus includes a communicator configured to communicate with a receptive apparatus; and a controller configured to control the communicator to transmit the at least one data packet, and to control the communicator to, in response to transmitting a last data packet among the at least one data packet, transmit at least one detection packet configured to be used to detect a loss of the last data packet. Wherein whether or not the last data packet is lost is determined by using the at least one detection packet.

The at least one data packet and the at least detection packet may comprise respective serial numbers, and in response to the serial number of the at least one detection packet not being sequential to the serial number of a most recently received data packet among the at least one data packet, it may be determined that the last data packet is lost.

According to one or more exemplary embodiments, a reception apparatus configured to receive data is provided, the reception apparatus includes a communicator configured to receive at least one data packet of a frame comprising one or more data packets and at least one detection packet configured to be used to detect a loss of a last data packet among the one or more data packets of the frame; and a controller configured to determine whether or not the last data packet of the frame is lost by using the at least one detection packet, and to control the communicator to, in response to determining that the last data packet is lost, request retransmission of the last data packet.

The at least one data packet and the at least detection packet may comprise respective serial numbers, and the controller may be further configured to, in response to the serial number of the at least one detection packet not being sequential to the serial number of a most recently received data packet among the at least one data packet, determine that the last data packet is lost.

According to one or more exemplary embodiments, one or more of the above methods may be recorded on a non-transitory computer-readable recording medium.

BRIEF DESCRIPTION OF THE DRAWINGS

These and/or other aspects will become apparent and more readily appreciated from the following description of one or more exemplary embodiments, taken in conjunction with the accompanying drawings of which.

DETAILED DESCRIPTION

Figure 1:
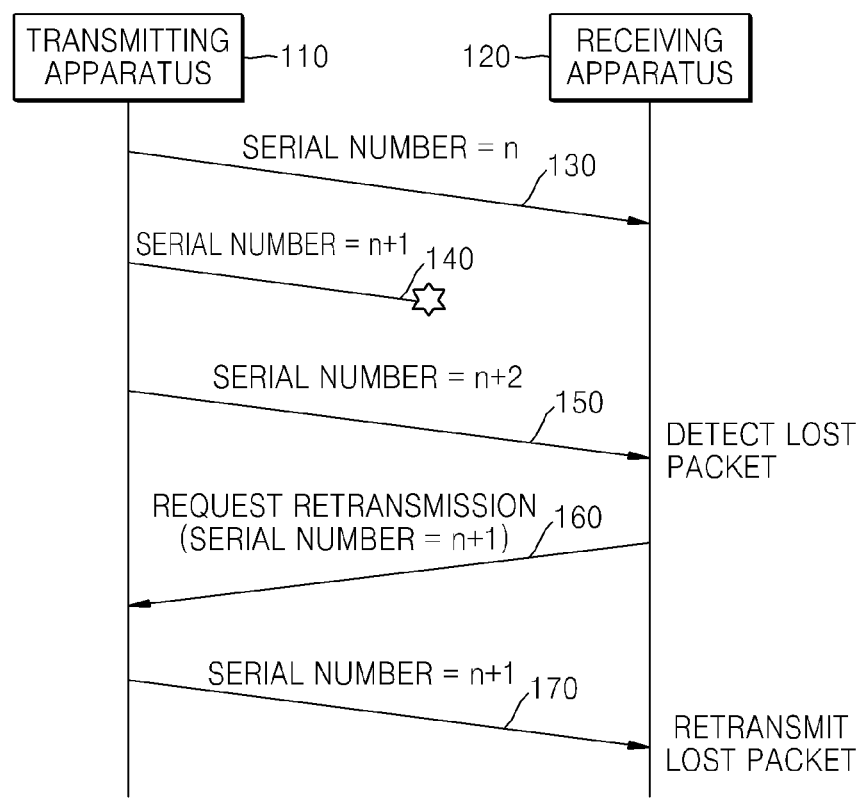
FIG. 1 is a conceptual view illustrating a process of recovering a lost data packet by using a retransmission method when a data packet is lost.

Reference will now be made in detail to one or more exemplary embodiments, examples of which are illustrated in the accompanying drawings. One or more exemplary embodiments may have different forms and should not be construed as being limited to the descriptions set forth herein. Accordingly, the exemplary embodiments described below by referring to the figures, are merely to explain aspects of the present description. In addition, all embodiments that may be easily derived by one of ordinary skill in the art from the detailed description and exemplary embodiments are construed as being included in the scope of the present invention. Elements that are not directly related to descriptions of the exemplary embodiments may be omitted in the drawings, so as not to obscure the description of the exemplary embodiments. Like reference numerals refer to like elements throughout.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements. As used herein, the term "and/or" includes any and all combinations of one or more of the associated listed items.

FIG. 1 is a conceptual view illustrating a process of recovering a lost data packet by using a retransmission method when a data packet is lost.

A data transmitting apparatus 110, such as a server, may transmit a frame containing at least one data packet to a data receiving apparatus 120, such as a client. The data receiving apparatus 120 may receive the frame containing the at least one data packet from the data transmitting apparatus 110. A serial number may be included in the transmitted data packet so that the data receiving apparatus 120 may detect a packet loss or for packet reordering.

In operation 130, the data transmitting apparatus 110 transmits a data packet having a serial number "n" to the data receiving apparatus 120. The data receiving apparatus 120 receives the data packet transmitted by the data transmitting apparatus 110, and may identify that a serial number of the received data packet is "n" by using serial number information included in the data packet.

In operation 140, the data transmitting apparatus 110 transmits a data packet having a serial number "n+1" to the data receiving apparatus 120. Here, it is assumed that the data packet having the serial number "n+1" is lost.

In operation 150, the data transmitting apparatus 110 transmits a data packet having a serial number "n+2" to the data receiving apparatus 120. The data receiving apparatus 120 receives a data packet transmitted by the data transmitting apparatus 110, and may identify that a serial number of the received data packet is "n+2" by using serial number information included in the data packet.

The data receiving apparatus 120 may identify that the serial number "n+2" of the currently received data packet is not subsequent to the serial number "n" of the previously received data packet. If the serial numbers of the received data packets are not sequential, a predetermined data packet may be lost in the middle. Specifically, if the serial numbers of the received data packets are "n" and "n+2," the data receiving apparatus 120 may detect that the data packet having the serial number "n+1" is lost. Although the serial numbers are described as being subsequent, this may mean directly subsequent in that the serial number n+2 is the not the next serial number in the series.

In operation 160, the data receiving apparatus 120 may request the data transmitting apparatus 110 to retransmit the lost data packet, that is, the data packet having the serial number "n+1." When requesting retransmission, the data receiving apparatus 120 may specify a retransmission requested data packet by using serial number information of the lost data packet.

In operation 170, the data transmitting apparatus 110 may retransmit a data packet requested by the data receiving apparatus 120. For example, when the data transmitting apparatus 110 has received a retransmission request regarding the data packet having the serial number "n+1" from the data receiving apparatus 120, the data transmitting apparatus 110 may transmit the data packet having the serial number "n+1" to the data receiving apparatus 120 according to the retransmission request.

According to the operations described above, a data packet that is lost during data transmission between the data transmitting apparatus 110 and the data receiving apparatus 120 may be detected and recovered.

Figure 2:
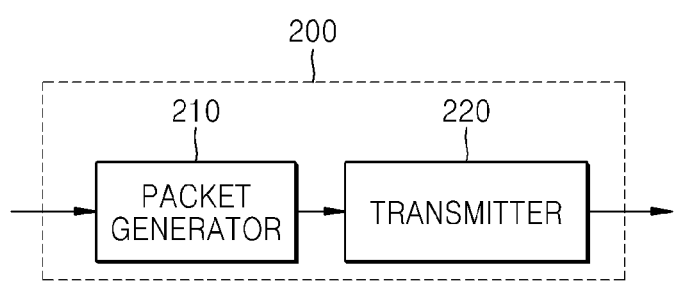
FIG. 2 is a block diagram illustrating a data transmitting apparatus according to an exemplary embodiment.

FIG. 2 is a block diagram illustrating a data transmitting apparatus 200 according to an exemplary embodiment.

Referring to FIG. 2, the data transmitting apparatus 200 according to an exemplary embodiment includes a packet generator 210, i.e. a packet generation unit, and a transmitter 220, i.e. a transmission unit. Functions of the data transmitting apparatus 200 are the same as those of the data transmitting apparatus 110 of FIG. 1.

Only elements of the data transmitting apparatus 200 that are related to the present exemplary embodiment are illustrated in FIG. 2. Accordingly, it will be understood by one of ordinary skill in the art that general elements in addition to the elements illustrated in FIG. 2 may be further included.

The packet generator 201 may generate a detection packet for detecting a loss of a data packet. Here, the detection packet is a packet transmitted to be subsequent to a last data packet of a frame, so that it may be determined whether or not the last data packet is lost, according to an exemplary embodiment.

When data is transmitted in frames, such as in the case of video images, a large amount of time may elapse when identifying whether or not the last data packet of the frame is lost.

In order to detect a lost data packet, a serial number of a data packet previously received in the data receiving apparatus 120 and a serial number of a data packet currently received in the data receiving apparatus 120 may be compared. For example, if the serial numbers of the previously received data packet and the currently received data packet are not sequential, then, the data receiving apparatus 120 may determine that a data packet is lost.

When data is transmitted in frames, the data receiving apparatus 120 may identify whether or not a last data packet of an nth frame is lost after a first packet of an (n+1)th frame is received. Therefore, in the case of a last data packet of each frame, a time that elapses when detecting a lost data packet may be longer than a time that elapses when detecting of other data packets of a frame.

According to an exemplary embodiment, the last data packet of the nth frame is transmitted to the data receiving apparatus 120 and then the detection packet is transmitted. Thus, whether or not the last data packet of the nth frame is lost may be detected without waiting until the first packet of the (n+1)th frame is received.

The detection packet may include identification information indicating a packet type, so that the data receiving apparatus 120 may distinguish the detection packet from the data packet. In other exemplary embodiments, the detection packet may be distinguished by only using information included in the detection packet, without separate identification information indicating the packet type. For example, since the detection packet includes header information and does not store information in a payload region, the detection packet may be distinguished from the data packet based on whether or not data is stored in the payload region.

The transmitter 220, i.e. transmission unit, may transmit a frame containing at least one data packet to the data receiving apparatus 120. Also, if a currently transmitting data packet is the last data packet of the frame, the transmitter 220 may transmit the detection packet to the data receiving apparatus 120 so that the detection packet is subsequent to the last data packet. Although a transmitter 220 is described, the data transmitting apparatus 200 may comprise a transceiver (not shown) configured to communicate with a data receiving apparatus 120. Further, the transceiver may be controlled by a controller (not shown). The controller may be embodied by a general purpose processor or a specially designed processor, and may include both software and hardware components.

The detection packet may be transmitted via a channel that is the same as a channel of the data packet (hereinafter, referred to as "in-band method"), or transmitted via a channel that is different from the channel of the data packet (hereinafter, referred to as "out-band method"). When an in-band method is used, the data receiving apparatus 120 may identify the detection packet. For example, identification information for identifying the detection packet may be inserted in the detection packet.

According to an exemplary embodiment, whether or not the last data packet is lost may be determined by using the detection packet. Specifically, if a serial number of the detection packet received by the data receiving apparatus 120 is not subsequent to a serial number of a data packet received previous to the detection packet, it may be determined that the last data packet is lost. If it is determined that the last data packet is lost, the data receiving apparatus 120 may request the data transmitting apparatus 110 to retransmit the last data packet. According to a retransmission request by the data receiving apparatus 120, the transmitter 220 may retransmit the lost data packet to the data receiving apparatus 120.

Figure 3A:
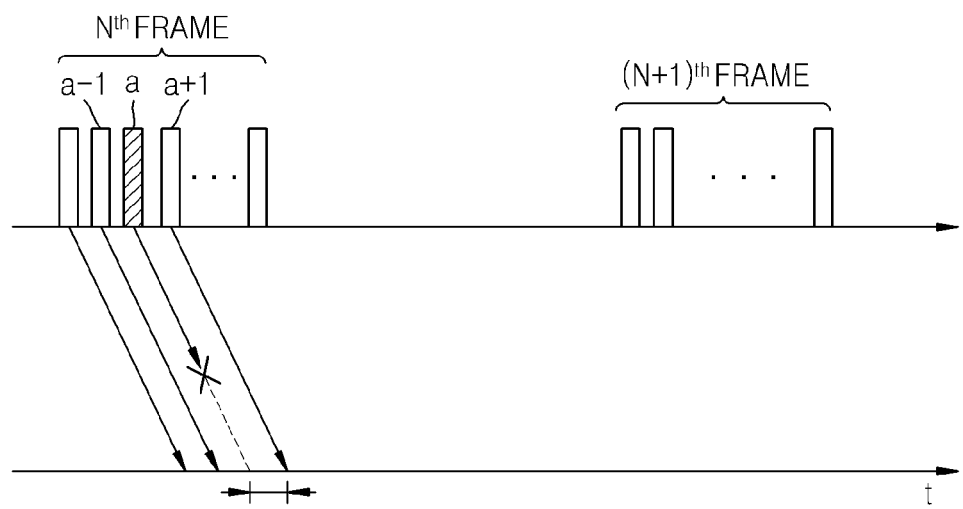
FIGS. 3A and 3B are views illustrating a time that elapses when detecting a loss of a data packet when the data packet is lost.
Figure 3B:
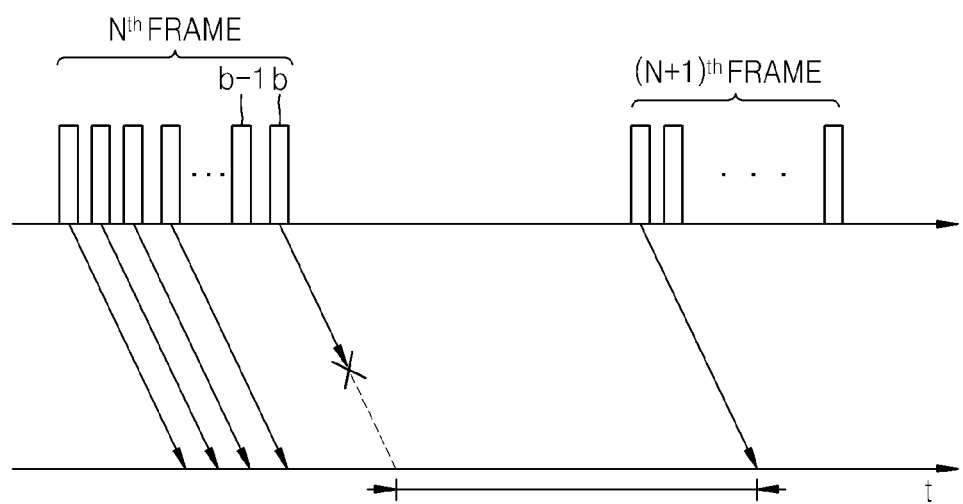

FIGS. 3A and 3B are views illustrating a time that elapses when detecting a loss of a data packet when the data packet is lost.

Referring to FIG. 3A, when some of at least one data packet of an nth frame is lost, the data receiving apparatus 120 may refer to a serial number of a subsequently transmitted packet and determine whether or not the data packet is lost.

For example, it is assumed that a data packet having a serial number "a" is lost. Since the data packet having the serial number "a" is lost, the data receiving apparatus 120 receives a data packet having a serial number "a−1," and then receives a data packet having a serial number "a+1." Since the serial numbers of the received data packets are not sequential, the data receiving apparatus 120 may detect that the data packet having the serial number "a" is lost.

In FIG. 3A, since a lost packet is not a last data packet of a frame, a time that elapses when detecting lost packet may be as much as a time interval between sequential transmissions of data packets in the frame.

FIG. 3B illustrates an example in which the last data packet is lost, from among at least one data packet of the nth frame.

For example, it is assumed that a last data packet having a serial number "b" is lost. in FIG. 3B, the data receiving apparatus 120 has received a data packet having a serial number "b−1," because the last data packet having the serial number "b" is lost.

If the detection packet is not used, in order to detect that the last data packet having the serial number "b" is lost, the data receiving apparatus 120 receives a first data packet of a subsequent frame, that is, an (n+1)th frame. In other words, before the (n+1)th frame is received, the data receiving apparatus 120 may not detect a loss of the last data packet. Therefore, a time that elapses when detecting a lost data packet may be longer than a time that elapses when detecting of other data packets of a frame.

According to an exemplary embodiment, a detection packet may be additionally transmitted to the data receiving apparatus 120 after a last data packet of a frame. Therefore, whether or not the last data packet is lost may be more quickly detected.

Figure 4:
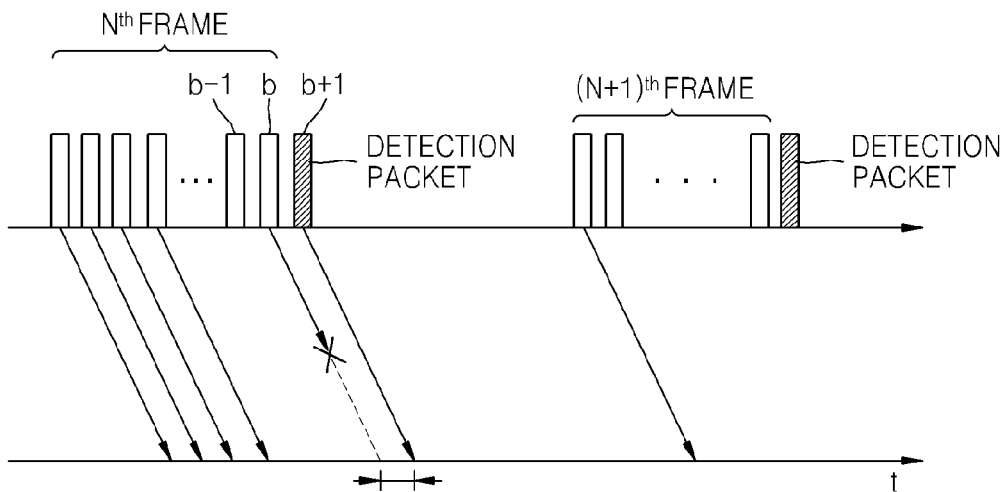
FIG. 4 is a view illustrating a process of detecting a loss of a data packet by transmitting a detection packet, according to an exemplary embodiment.

FIG. 4 is a view illustrating a process of detecting a loss of a data packet by transmitting a detection packet, according to an exemplary embodiment.

Referring to FIG. 4, after a last data packet of an nth frame is transmitted, the detection packet may be additionally transmitted. If a serial number of the last data packet is "b," a serial number of the detection packet may be "b+1."

For example, it is assumed that a last data packet having a serial number "b" is lost. If the detection packet is not transmitted, in order to detect a loss of the last data packet, it is waited until a subsequent (n+1)th frame is received. However, if the detection packet is used, since the last data packet having the serial number "b" is lost, the data receiving apparatus 120 receives a data packet having a serial number "b−1," and then receives a detection packet having a serial number "b+1." Since the serial numbers of the received data packets are not sequential, the data receiving apparatus 120 may detect that the last data packet having the serial number "b" is lost.

Since the detection packet is additionally transmitted, a time that elapses when detecting a lost last data packet may be reduced to equal a time interval between sequential transmissions of data packets in a frame.

In other words, since the detection packet is additionally transmitted, when data is transmitted in frames, whether or not a last data packet is lost may be more quickly detected.

Figure 5:
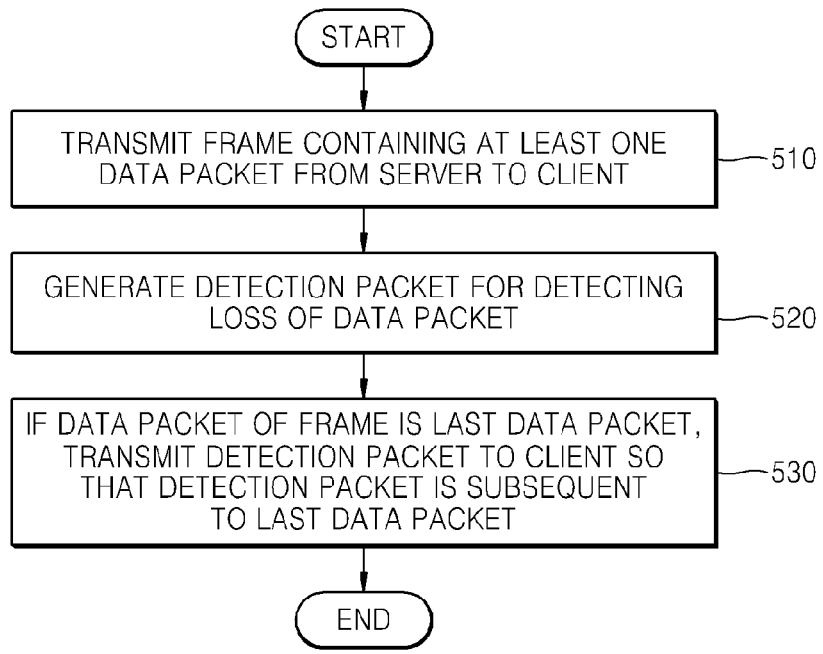
FIG. 5 is a flowchart illustrating a data transmitting method according to an exemplary embodiment.

FIG. 5 is a flowchart illustrating a data transmitting method according to an exemplary embodiment.

In operation 510, the data transmitting apparatus 110 may transmit a frame containing at least one data packet to the data receiving apparatus 120. The data transmitting apparatus 110 may include a device for storing a predetermined amount of data packets transmitted to the data receiving apparatus 120 for a predetermined amount of time. A serial number may be included in a transmitted data packet so that the data receiving apparatus 120 may detect a packet loss or for packet reordering.

In operation 520, the data transmitting apparatus 110 may generate a detection packet for detecting a loss of a packet. Identification information indicating a packet type may be included in a field of the detection packet, so that the data receiving apparatus 120 may distinguish the detection packet from a data packet. In other exemplary embodiments, the detection packet may include header information and not store information in a payload region. Then, the detection packet may be distinguished from the data packet based on whether or not data is included in the payload region.

In operation 530, if a data packet of a frame is a last data packet, the detection packet may be transmitted to the data receiving apparatus 120 so that the detection packet is subsequent to the last data packet. If a serial number of the detection packet received by the data receiving apparatus 120 is not subsequent to a serial number of a data packet received previous to the detection packet, the data receiving apparatus 120 may determine that the last data packet is lost.

If it is determined that the last data packet is lost, the data receiving apparatus 120 may request the data transmitting apparatus 110 to retransmit the last data packet. According to a packet retransmission request by the data receiving apparatus 120, the transmission unit 220 may retransmit a lost data packet to the data receiving apparatus 120.

Figure 6:
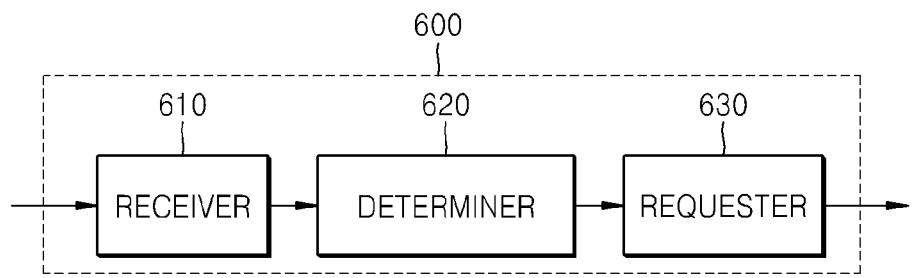
FIG. 6 is a block diagram illustrating a data receiving apparatus according to an exemplary embodiment.

FIG. 6 is a block diagram illustrating a data receiving apparatus 600 according to an embodiment of the present invention.

Referring to FIG. 6, the data receiving apparatus 600 according to an embodiment of the present invention includes a receiver 610, i.e. a reception unit, a determiner 620, i.e. a determination unit or a decision unit, and a requester 630, i.e. a request unit. Functions of the data receiving apparatus 600 are the same as those of the data receiving apparatus 120 of FIG. 1.

Only elements of the data transmitting apparatus 600 that are related to the present exemplary embodiment are illustrated in FIG. 6. Accordingly, it will be understood by one of ordinary skill in the art that general elements in addition to the elements illustrated in FIG. 6 may be further included.

The receiver 610 may receive a frame containing at least one data packet and a detection packet for detecting a loss of a last data packet of the frame. Here, the detection packet is a packet that is transmitted to be subsequent to the last data packet of the frame, so that it may be determined whether or not the last data packet is lost, according to an exemplary embodiment.

The determiner 620 may determine whether or not the last data packet is lost by using a detection packet received from the data transmitting apparatus 110. Specifically, a serial number of a data packet previously received in the data receiving apparatus 600 and a serial number of a data packet currently received in the data receiving apparatus 600 may be compared. For example, if the serial numbers of the previously received data packet and the currently received data packet are not sequential, then, the determiner 620 may determine that a data packet is lost.

Thus, if a serial number of a detection packet received from the data transmitting apparatus 110 by the data receiving apparatus 600 is not subsequent to a serial number of a last data packet of a frame, then, the data receiving apparatus 600 may determine that the last data packet is lost.

The requester 630 may request the data transmitting apparatus 110 to retransmit the last data packet, based on a determination result of the determiner 620. Specifically, if the determiner 620 determines that the data packet is lost, the requester 630 may request the data transmitting apparatus 110 to retransmit a lost packet.

Although a receiver 610 is described, the data receiving apparatus 200 may comprise a transceiver (not shown) configured to communicate with a data transmitting apparatus 110. Further, the transceiver may be controlled by a controller (not shown). Further, the controller may perform the functions of the determiner and control the receiver to request the data transmitting apparatus 110 to retransmit a lost packet if it is determined that the data packet is lost. The controller may be embodied by a general purpose processor or a specially designed processor, and may include both software and hardware components.

Figure 7:
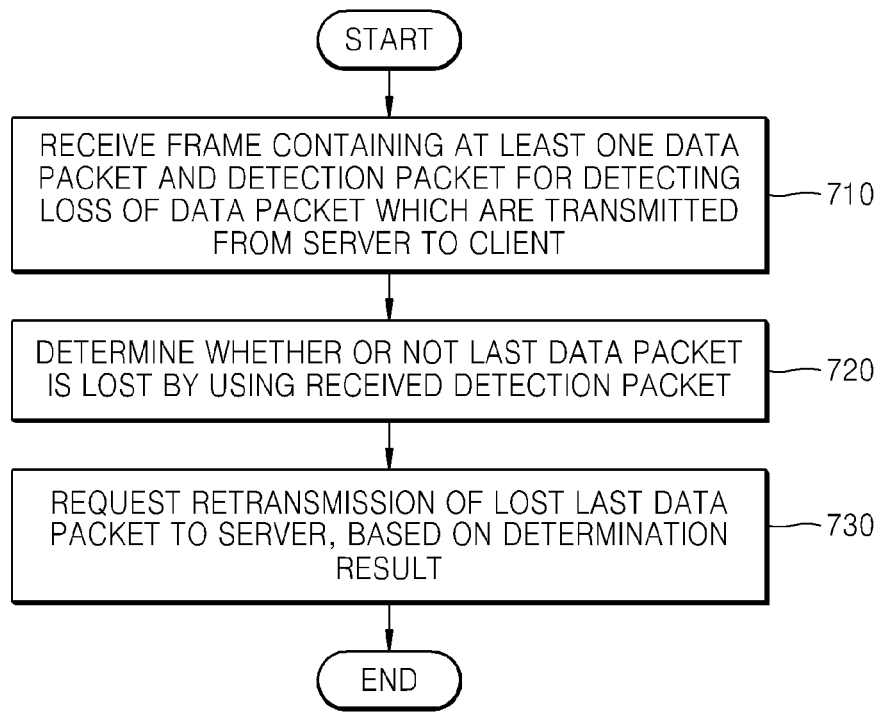
FIG. 7 is a flowchart illustrating a data receiving method according to an exemplary embodiment.

FIG. 7 is a flowchart illustrating a data receiving method according to an exemplary embodiment.

In operation 710, the data receiving apparatus 120 may receive a frame containing at least one data packet and a detection packet for detecting a loss of the data packet. A serial number may be included in the at least one received data packet and the received detection packet so that the data receiving apparatus 120 may detect a packet loss or for packet reordering.

In operation 720, whether or not a last data packet of the frame packet is lost may be determined by using the received detection packet of operation 710.

Specifically, a serial number of a data packet previously received in the data receiving apparatus 120 and a serial number of a data packet currently received in the data receiving apparatus 120 may be compared. For example, if the serial numbers of the previously received data packet and the currently received data packet are not sequential, then, the data receiving apparatus 120 may determine that the data packet is lost.

Thus, if a serial number of the detection packet received from the data transmitting apparatus 110 by the data receiving apparatus 120 is not subsequent to a serial number of the last data packet of the frame, then, the data receiving apparatus 120 may determine that the data packet is lost.

In operation 730, the data receiving apparatus 120 may request the data transmitting apparatus 110 to retransmit a lost last data packet, based on a determination result of operation 720. Specifically, if it is determined that the data packet is lost in operation 720, the data receiving apparatus 120 may request the data transmitting apparatus 110 to retransmit a lost packet.

Figure 8:
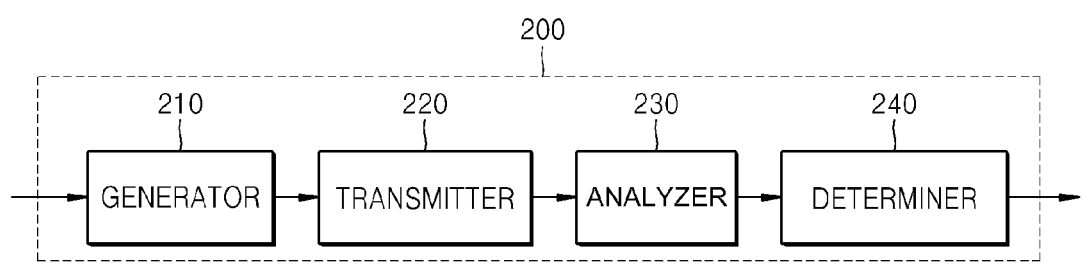
FIG. 8 is block diagram illustrating a data transmitting apparatus according to another exemplary embodiment.

FIG. 8 is block diagram illustrating a data transmitting apparatus 200 according to another exemplary embodiment.

Referring to FIG. 8, the data transmitting apparatus 200 according to another exemplary embodiment includes a packet generator 210, i.e. a packet generation unit, a transmitter 220, i.e. a transmission unit, an analyzer 230, i.e. an analysis unit, and a determiner 240, i.e. a determination unit or a decision unit. Functions of the data transmitting apparatus 200 are the same as those of the data transmitting apparatus 110 of FIG. 1.

Only elements of the data receiving apparatus 200 that are related to the present exemplary embodiment are illustrated in FIG. 8. Accordingly, it will be understood by one of ordinary skill in the art that general elements in addition to the elements illustrated in FIG. 8 may be further included.

The packet generator 210 may generate a detection packet for detecting a loss of a data packet.

The transmitter 220 may transmit a frame containing at least one data packet to the data receiving apparatus 120. Also, if a currently transmitted data packet is a last data packet of the frame, the transmitter 220 may transmit the detection packet to the data receiving apparatus 120 so that the detection packet is subsequent to the last data packet of the frame.

The analyzer 230 may analyze a packet loss rate of a network. When the packet loss rate of the network increases, a possibility of losing not only the last data packet of the frame, but also losing the detection packet transmitted to be subsequent to the last data packet increases also. If the last data packet and the detection packet are both lost, the data receiving apparatus 120 may not be able to detect whether or not the last data packet is lost until a subsequent frame has been received.

The determiner 240 may determine the number of detection packets to be generated, based on the packet loss rate analyzed by the analyzer 230. The number of detection packets may increase as the packet loss rate increases.

Figure 9:
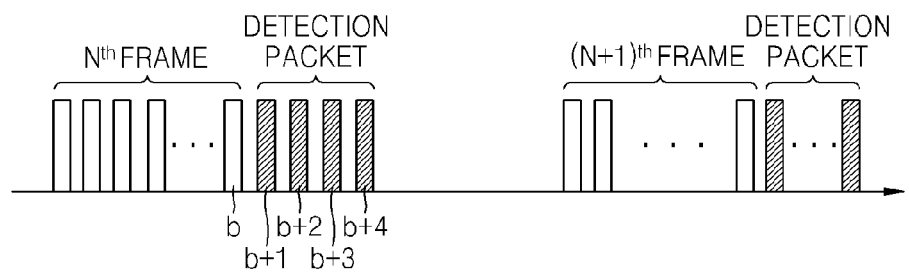
FIG. 9 is a view illustrating a process of generating a detection packet based on a network status according to an exemplary embodiment.

FIG. 9 is a view illustrating a process of generating a detection packet based on a network status.

Referring to FIG. 9, the data transmitting apparatus 200 according to an exemplary embodiment may determine the number of detection packets to be generated based on a packet loss rate of a network. The number of detection packets may increase as the packet loss rate of the network increases.

For example, it is assumed that four detection packets are generated, based on an analysis result regarding the network status.

Some of the four detection packets may be lost. Here, based on a serial number "b" of a last data packet of a frame, serial numbers of the four detection packets may respectively be "b+1," "b+2," "b+3" and "b+4." It is assumed that detection packets having serial numbers "b+2" and "b+3" are lost during a transmission process between the data transmitting apparatus 110 and the data receiving apparatus 120.

The data receiving apparatus 120 may receive a detection packet having a serial number "b+1" and then immediately receive a detection packet having a serial number "b+4." The data receiving apparatus 120 may detect a loss of a packet by detecting that the serial numbers of the received detection packets are not sequential. After detecting the loss of the packet, the data receiving apparatus 120 may determine whether a lost packet is a data packet or the detection packet.

Since the packets having the serial numbers "b+2" and "b+3" are the detection packets, and detection packets do not include data information, according to a determination result, the data receiving apparatus 120 may not request the data transmitting apparatus 110 to retransmit the lost packet.

As another example, the last data packet and some of the detection packets may be lost. Referring to FIG. 9, it is assumed that the last data packet having the serial number "b" and the detection packet having the serial number "b+1" are lost. When only one detection packet is transmitted, a loss of the last data packet may not be promptly detected. However, if a plurality of detection packets are generated, the loss of the last data packet may be more reliably detected, compared to when only one detection packet is generated.

The data receiving apparatus 120 may receive a data packet having a serial number "b−1," and then receive the detection packet having the serial number "b+2." The data receiving apparatus 120 may detect a loss of a packet by detecting that the serial numbers of the received detection packets are not sequential. In this case, the data receiving apparatus 120 may request the data transmitting apparatus 110 to retransmit a data packet. That is, the data receiving apparatus 120 may request the data transmitting apparatus 110 to retransmit the last data packet having the serial number "b." However, the data receiving apparatus 120 may not request the transmitting apparatus 110 to retransmit a detection packet. That is, the data receiving apparatus 120 may not request the data transmitting apparatus 110 to retransmit the detection packet having the serial number "b+1."

Figure 10:
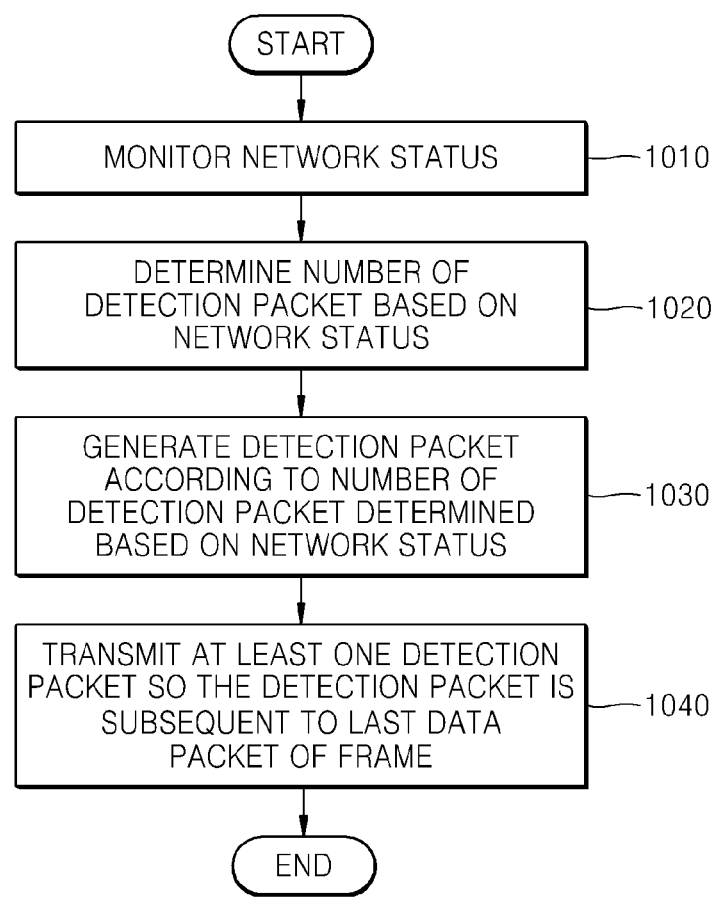
FIG. 10 is a flowchart illustrating a method of transmitting a detection packet based on a network status, according to an exemplary embodiment.

FIG. 10 is a flowchart illustrating a method of transmitting a detection packet based on a network status, according to an embodiment of the present invention.

In operation 1010, the data transmitting apparatus 110 may monitor the network status. Information regarding the network status may include information regarding a packet loss rate. The packet loss rate is a probability of a packet transmitted by the data transmitting apparatus 110 not being received in the data receiving apparatus 120.

In operation 1020, the data transmitting apparatus 110 may determine the number of detection packets to be generated, based on the network status monitored in operation 1010. The number of detection packets may increase as the packet loss rate of a network increases.

In operation 1030, the data transmitting apparatus 110 may generate the detection packet, according to the number of detection packets determined in operation 1020 based on the network status.

In operation 1040, the data transmitting apparatus 110 may transmit at least one detection packet generated in operation 1030 to be subsequent to a last data packet of a frame. If a serial number of the detection packet received by the data receiving apparatus 120 is not subsequent to a serial number of a data packet received previous to the detection packet, it may be determined that the last data packet is lost.

According to another exemplary embodiment, the receiving apparatus 600 may receive a plurality of detection packets, based on a network status.

The receiver 610 may receive a frame containing at least one data packet and a detection packet for detecting a loss of the last data packet of the frame. For example, when a packet loss rate of a network increases, the number of detection packets transmitted from the data transmitting apparatus 110 may increase.

The determiner 620 may determine whether or not the last data packet is lost by using the detection packet received from the data transmitting apparatus 110. For example, if a serial number of the detection packet received by the data receiving apparatus 600 from the data transmitting apparatus 110 is not subsequent to a serial number of the last data packet of the frame, then, the data receiving apparatus 600 may determine that the last data packet is lost.

After identifying that a packet is lost, the determination unit 620 may decide whether a lost packet is a data packet or the detection packet.

When the lost packet is the data packet, the request unit 630 may request the data transmitting apparatus 110 to retransmit the lost packet. If the lost packet is the data packet according to a determination result of the determiner 620, the requester 630 may request the data transmitting apparatus 110 to retransmit the lost packet. Alternatively, if the lost packet is the detection packet, the requester 630 may not request the data transmitting apparatus 110 to retransmit the lost packet. This is because the detection packet is for determining whether or not the data packet is lost, and does not include data information other than header information.

Figure 11:
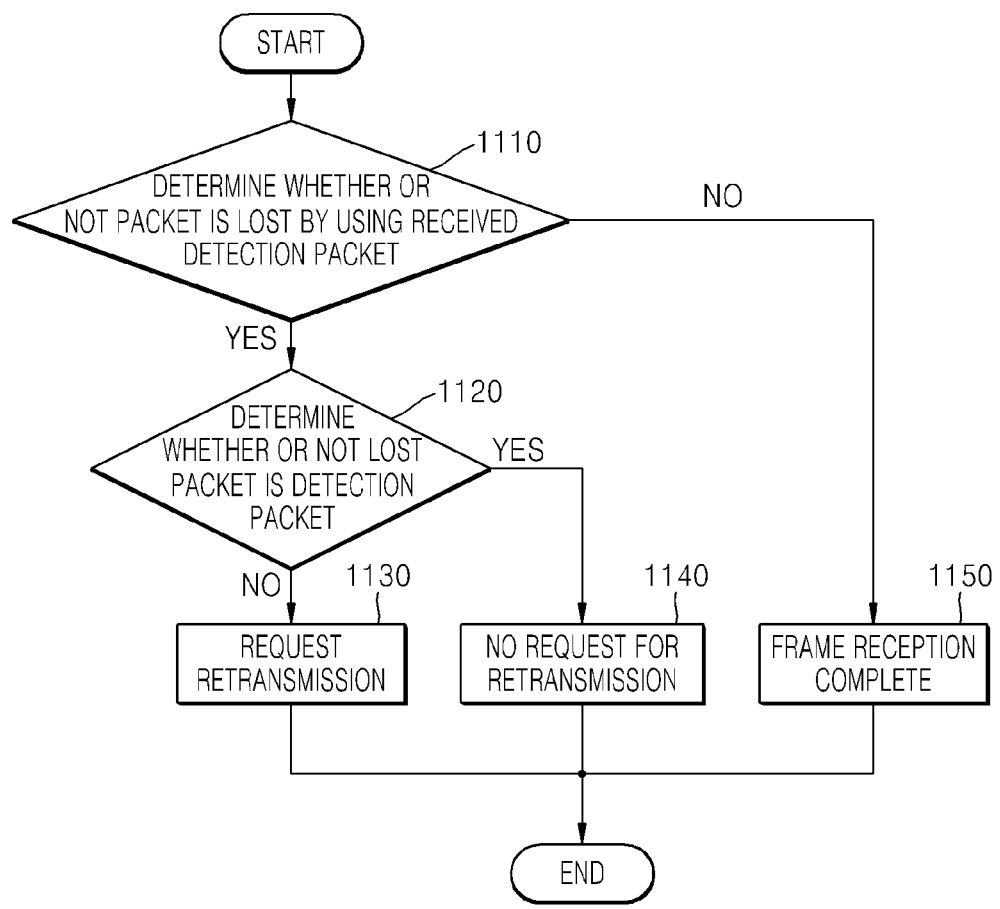
FIG. 11 is a flowchart illustrating a method of receiving data based on a network status, according to an exemplary embodiment.

FIG. 11 is a flowchart illustrating a method of receiving data based on a network status, according to an exemplary embodiment. In an exemplary embodiment related to FIG. 11, it is assumed that a plurality of detection packets are received from the data transmitting apparatus based on the network status.

In operation 1110, the data receiving apparatus 120 may determine whether or not a packet is lost by using a received detection packet. According to an exemplary embodiment, when a packet loss rate of a network increases, the data receiving apparatus 120 may receive the plurality of detection packets.

When a packet loss is detected in operation 1110, in operation 1120, the data receiving apparatus 120 may determine whether a lost packet is a data packet or a detection packet.

In operation 1130, the lost packet is the data packet, according to a determination result of operation 1120. The data receiving apparatus 120 may request the data transmitting apparatus 110 to retransmit the lost packet.

In operation 1140, the lost packet is the detection packet, according to the determination result of operation 1120. The data receiving apparatus 120 does not request the data transmitting apparatus 110 to retransmit the lost packet. This is because the detection packet is for determining whether or not the data packet is lost, and does not include data information other than header information.

In operation 1150, the data receiving apparatus 120 did not detect the lost packet. Thus, the data receiving apparatus 120 completes receiving a frame containing at least one data packet.

One or more exemplary embodiments may be described in terms of functional block components and various processing steps. Such functional blocks may be realized by any number of hardware and/or software components configured to perform the specified functions. For example, exemplary embodiments may employ various integrated circuit components, e.g., memory elements, processing elements, logic elements, look-up tables, and the like, which may carry out a variety of functions under the control of one or more microprocessors or other control devices. Similarly, elements of exemplary embodiments may be implemented by using software programming or software elements, exemplary embodiments may be implemented with any programming or scripting language such as, as non-limiting examples, C, C++, Java, assembler, or the like, with the various algorithms being implemented with any combination of data structures, objects, processes, routines or other programming elements. Functional aspects may be implemented in algorithms that are executed on one or more processors. Furthermore, one or more exemplary embodiments could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A method of transmitting data, by a transmitting device, the method comprising:
   identifying a packet loss rate of a network;
   determining a number of at least one detection packet to be generated according to the packet loss rate;
   generating the at least one detection packet for detecting a loss of a last data packet among a plurality of data packets based on a result of the determining;
   transmitting a frame containing a plurality of data packets to a receiving device; and
   in response to the last data packet of a frame being transmitted, transmitting the at least one detection packet so that the at least one detection packet is transmitted subsequent to the last data packet to the receiving device,
   receiving a packet transmission request for the last data packet when a serial number of the at least one detection packet received in the receiving device is not subsequent to a serial number of the last data packet,
   wherein the at least one detection packet is distinguished from each of the plurality of data packets based on header information including a packet type,
   wherein, a loss of a data packet is determined by using a serial number of a subsequent data packet of the data packet, and the loss of the last data packet is determined by using a serial number of the at least one detection packet, and
   wherein the number of the at least one detection packet is increased as the packet loss rate of the network is increased.

2. The method of claim 1, wherein in response to the serial number of the at least one detection packet not being subsequent to the serial number of the last data packet, it is determined that the last data packet is lost, and
   wherein, the transmission method further comprises transmitting the last data packet to the receiving device, according to the packet retransmission request that is received after the at least one detection packet is transmitted.

3. The method of claim 2, further comprising, in response to a retransmission requested packet not being a detection packet, transmitting the requested packet.

4. A non-transitory computer-readable recording medium having recorded thereon a program for executing the method of claim 1.

5. A method of receiving data, by a receiving device, the method comprising:
   receiving a frame containing a plurality of data packets and a detection packet among at least one detection packet for detecting a loss of a last data packet of the frame from a transmitting device;
   determining whether or not the last data packet is lost by using the detection packet; and
   transmitting a packet retransmission request for the last data packet when a serial number of the at least one detection packet received in the receiving device, is not subsequent to a serial number of the last data packet,
   wherein the detection packet is distinguishable from each of the plurality of data packets based on header information including a packet type,
   wherein a loss of a data packet is determined by using a serial number of a subsequent data packet of the data packet, and the loss of the last data packet is determined by using the serial number of the detection packet,
   wherein a number of at least one detection packet transmitted from the transmitting device is determined according to a packet loss rate of a network, and
   wherein the number of the at least one detection packet is increased as the packet loss rate of the network is increased.

6. The method of claim 5, further comprising receiving the last packet in response to the packet retransmission request.

7. The method of claim 5, wherein the determining further comprises:
   determining whether or not a lost packet is a detection packet; and
   in response to the lost packet not being a detection packet, requesting retransmission of the lost packet.

8. A device for transmitting a frame of data containing a plurality of data packets, the device comprising:
   a communicator;
   a processor;
   at least one memory having stored thereon computer program code, that, when executed by the processor, instructs the processor configured to identify a packet loss rate of a network, to determine a number of at least one detection packet to be generated according to the packet loss rate, to generate the at least one detection packet for detecting a loss of a last data packet among the plurality of data packets based on a result of the determining, to control the communicator to transmit at least one data packet and the at least one detection packet to a receiving device, in response to the last data packet of the frame being transmitted, transmit the at least one detection packet subsequent to the last data packet to the receiving device, and receive a packet retransmission request for the last data packet when a serial number of the at least one detection packet received in the receiving device is not subsequent to a serial number of the last data packet, wherein the at least one detection packet is distinguished from each of the plurality of data packets based on header information including a packet type, wherein, a loss of a data packet is determined by using a serial number of a subsequent data packet of the data packet, and the loss of the last data packet is determined by using the serial number of the at least one detection packet, and wherein the number of the at least one detection packet is increased as the packet loss rate of the network is increased.

9. The device of claim 8, wherein the processor is further configured to, in response to the serial number of the at least one detection packet not being subsequent to the serial number of the last data packet, determine that the last data packet is lost and to control the communicator to transmit the last data packet to the receiving device, according to the packet retransmission request that is received after the detection packet is transmitted.

10. The device of claim 9, wherein, in response to a retransmission requested packet is not the at least one detection packet, the processor is further configured to control the communicator to transmit the requested packet.

11. A device for receiving data, the device comprising:
a communicator;
a processor; and
at least one memory having stored thereon computer program code, that, when executed by the processor, instructs the processor to control the communicator to receive a frame containing a plurality of data packets and a detection packet among at least one detection packet for detecting a loss of a last data packet of the frame from a transmitting device, to determine whether or not a last data packet is lost by using the detection packet, to control the communicator to transmit a packet retransmission request for the last data packet when a serial number of the at least one detection packet received in the receiving device is not subsequent to a serial number of the last data packet, wherein the detection packet is distinguishable from each of the plurality of data packets based on header information including a packet type, wherein a loss of a data packet is determined by using a serial number of a subsequent data packet of the data packet, and the loss of the last data packet is determined by using the serial number of the detection packet, wherein a number of at least one detection packet transmitted from the transmitting device is determined according to a packet loss rate of a network, and wherein the number of the at least one detection packet is increased as the packet loss rate of the network is increased.

12. The device of claim 11, wherein in response to the serial number of the detection packet not being subsequent to a serial number of a data packet most recently received among the plurality of data packets, the processor is further configured to request retransmission of the last data packet among the plurality of data packets.

13. The device of claim 12, wherein the processor is further configured to determine whether or not a lost packet is a detection packet; and wherein, in response to the lost packet not being a detection packet, the processor is further configured to request retransmission of the lost packet.

* * * * *